No. 631,850. Patented Aug. 29, 1899.
J. JONES.
DRAFT EQUALIZER.
(Application filed Mar. 16, 1899.)

(No Model.)

Witnesses.
Samuel H. Rudolph
A. W. Straight

Inventor.
James Jones
By Thomas B. Swan
His Attorney

UNITED STATES PATENT OFFICE.

JAMES JONES, OF ATLANTIC, IOWA.

DRAFT-EQUALIZER.

SPECIFICATION forming part of Letters Patent No. 631,850, dated August 29, 1899.

Application filed March 16, 1899. Serial No. 709,269. (No model.)

*To all whom it may concern:*

Be it known that I, JAMES JONES, a citizen of the United States of America, residing at the city of Atlantic, in the county of Cass and State of Iowa, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in four-horse equalizers; and it consists in the peculiar construction and combination of the parts, that will be more fully set forth hereinafter and particularly pointed out in the claims.

The object of my invention is to furnish a draft-equalizer for working four horses abreast to be used in connection with harvesting-machines, plows, and other agricultural implements which will be durable, simple of construction, and easy to apply to harvesting-machines, plows, and other agricultural implements. I attain this object by the device illustrated in the accompanying drawings, in which—

Figure 2:
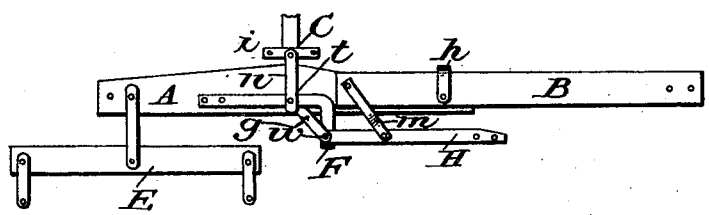
Figure 1:
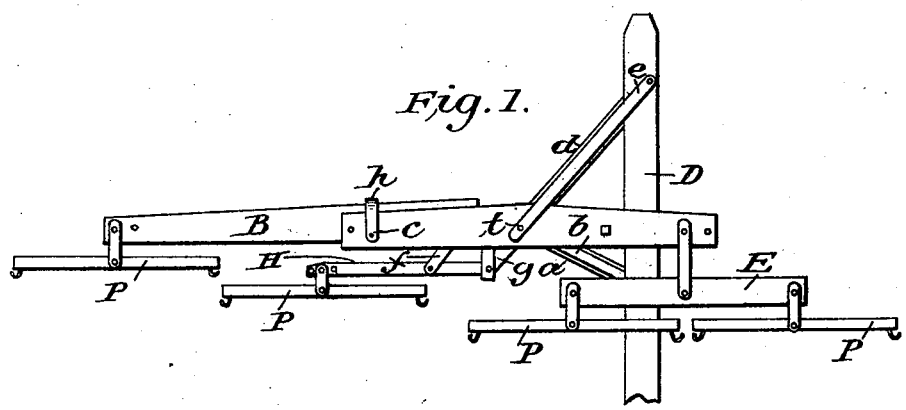

Figure 1 is a top or plan view of the draft-equalizer secured to the pole of a self-binding harvester, and Fig. 2 is a plan view of same applied to a right-hand plow having the singletrees removed.

Similar letters refer to similar parts throughout both views.

D represents the rear portion of the pole or tongue of a self-binding harvester constructed in the ordinary manner.

A, B, and H are levers. The lever A is pivotally connected to the outer ends of the supports or brackets $a$ and $b$ and the straps $d$ and $e$ by the pivot $t$. The bracket $a$ is firmly secured to the under side and the bracket $b$ to the upper side of the pole D by a bolt. The strap $d$ is secured to the under side and the strap $e$ to the upper side of the pole D by a bolt. The lever B is pivotally connected to the lever A by means of the pivot $c$.

F is a bracket firmly secured to the lever A. The inner end of the lever H is pivotally connected to the bracket F.

$f$ and $m$ are straps pivotally connected to the lever H and to the inner end of the lever B.

$g$ is a strap connected at one end to the pivot $w$ and at the other end to the pivot $t$.

$h$ is a loop connected at each end to the pivot $c$.

E is an ordinary doubletree.

P is an ordinary singletree.

C represents the forward part of an ordinary plow-beam having the head $i$.

When the equalizer is attached to a plow, the brackets $a$ and $b$ and the straps $d$ and $e$ are omitted and the equalizer is attached to the plow by means of the clevis $n$.

When the equalizer is attached to a right-hand plow, it is turned over, so that the under side, as shown in Fig. 1, becomes the upper side, as shown in Fig. 2.

From the foregoing description the operation of the equalizer becomes apparent.

Having thus described my invention, what I claim as new, and desire to secure by Letters Patent, is—

1. The combination in a four-horse equalizer of the lever A adapted to be pivotally secured to an agricultural implement, the lever B pivoted, between its ends, to the lever A, and the lever H pivotally connected at its inner end to the lever A, and pivotally connected, between its ends, to the inner end of the lever B, substantially as described.

2. The combination in a four-horse equalizer of the lever A adapted to be pivotally secured to an agricultural implement, the lever B pivoted to the lever A, the bracket F firmly secured to the lever A, the lever H pivoted to the bracket F, and the strap $f$ pivoted at one end to the lever B and at the other end to the lever H, substantially as described.

Signed by me at the city of Atlantic, in the county of Cass and State of Iowa, this 13th day of March, A. D. 1899.

JAMES JONES.

Witnesses:
   W. D. FRITZ,
   H. J. FRITZ.